Figure 1:
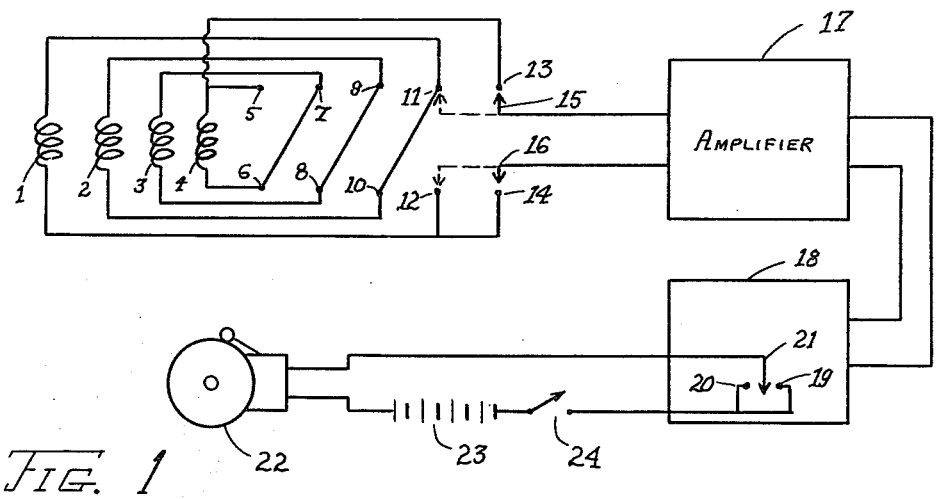

June 18, 1957  I. E. CHURCH  2,796,600
SPINDLE UNBALANCE ALARM

Filed Nov. 30, 1954  2 Sheets-Sheet 1

INVENTOR.
Ira E. Church
BY
William J. Ruano
ATTORNEY

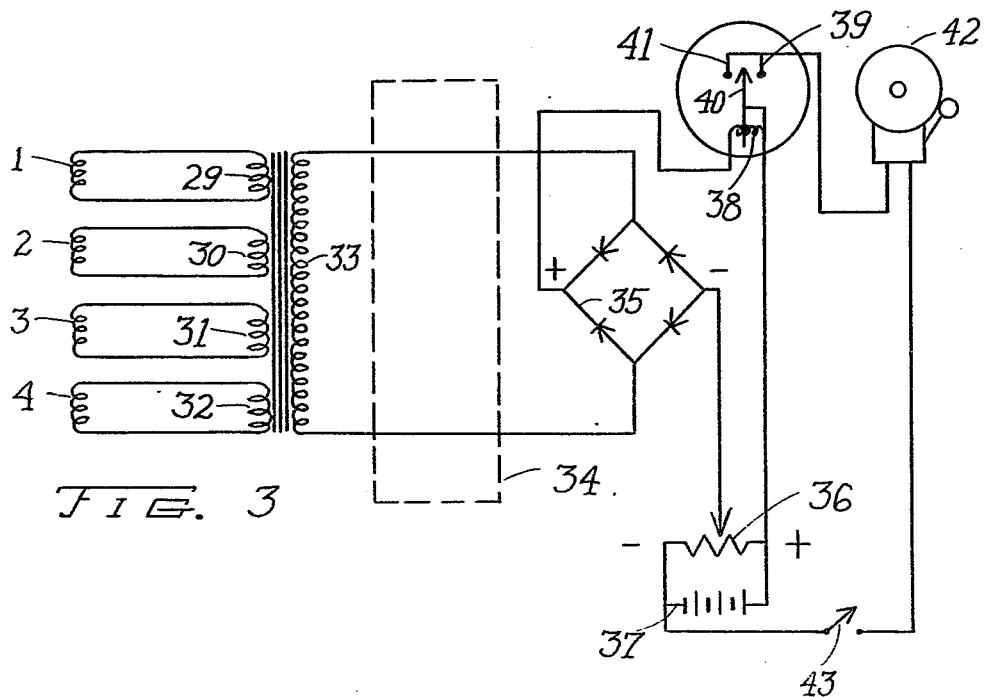
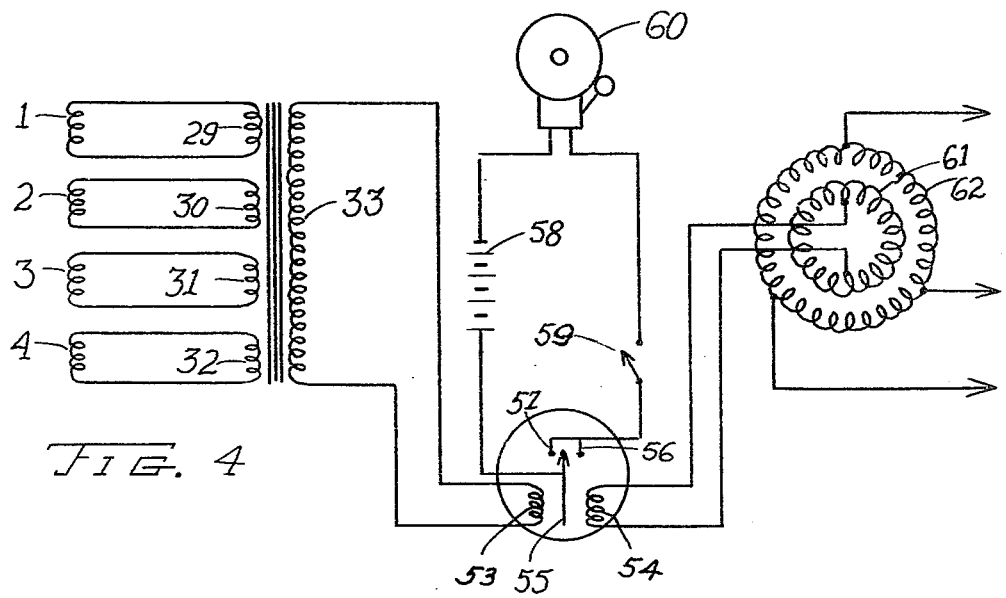

United States Patent Office 2,796,600
Patented June 18, 1957

2,796,600

SPINDLE UNBALANCE ALARM

Ira E. Church, Redondo Beach, Calif.

Application November 30, 1954, Serial No. 471,980

7 Claims. (Cl. 340—261)

My invention relates to a system for detecting dynamic unbalance and, more particularly to an alarm system for detecting any change in the vibration of a body rotating in two or more bearings, for example, a turbine spindle.

An object of my invention is to provide an alarm system which will warn of any change in the vibration characteristics of a rotating body, such as would occur if a portion of blading should break off, or a bearing should wear sufficiently to cause a rub of the rotating element.

In the past, alarm systems for detecting changes in steam turbines and attached generators, have been designed to warn of vibration amplitudes in excess of some preset value. A sampling device was generally used to connect each bearing vibration pickup, sequentially, to a recording instrument. An alarm, triggered by the meter, was then set higher than the normal maximum vibration reading for any given bearing.

However, loss of weight in a turbine spindle may not increase the amplitude of the maximum vibration reading, but decrease it, instead, and increase other vibrations to values less than the maximum, in which case the alarm would not function. Moreover the phase angle of the vibration voltage of a vibration pickup is more subject to change than the vibration amplitude, and thus serves as a much more reliable indicator of trouble.

More specifically, in accordance with my invention, I have found from experience in taking vibration readings before and after adding balancing weights, in the process of balancing a rotating element, that an added weight in any plane of the unit will change the phase angle of the vibration more than the amplitude at all bearings. The increase or decrease in vibration amplitude may be very small but the phase angle of one or more of these vibrations is nearly always changed, some times as much as 180 degrees. Therefore the phase angle of the vibration vector, generated by a vibration pickup, becomes a much better indicator of any change in the unit than the amplitude and can be used to sound an alarm or shut down the unit.

In accordance with my invention, I have also made the discovery that when two or more vibration pickups are connected in series (or parallel) to give a vector sum value of the individual voltages of the various pickups, such vector sum will be a more reliable indicator of unbalance than any of the individual pickups, moreover such vector sum detects unbalance and anticipates trouble far more quickly. Unbalance is indicated by smaller changes in the vector sum than in the individual pickup voltages.

One method of carrying out such alarm system is to amplify and rectify this vector sum voltage and connect it to a D. C. graphic recording meter. Two alarm contacts, on this meter, are manually adjusted so that a third contact, moving therebetween with the pen, will make contact with one of them should the pen move outside the path of normal operation. The pickups can be connected to a switching station where the meter can be connected, in turn, to each of the pickups and the individual readings compared with previous readings.

An object of my invention is to provide a novel alarm system that will detect an unbalance in a spindle or rotor far more quickly and more reliably than presently known systems.

Figure 2:
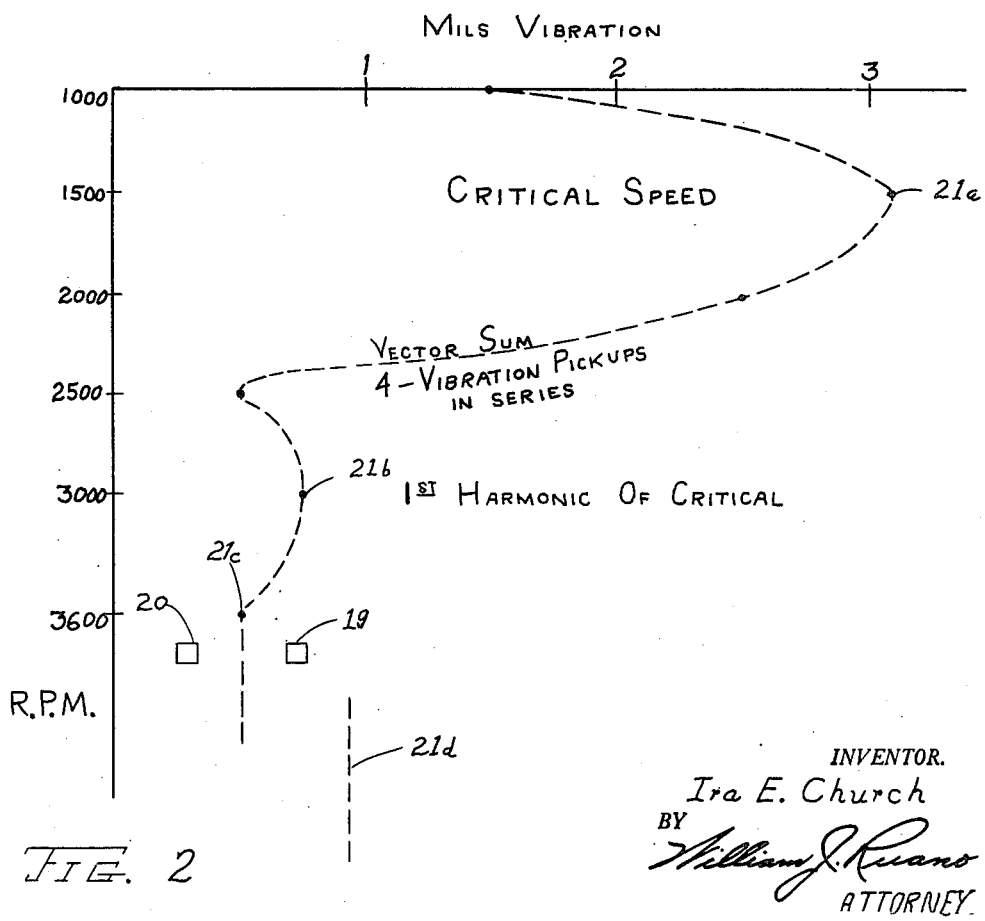

Other objects of my invention will become more apparent from a study of the following specification in conjunction with the accompanying drawing in which:

Figure 1 is a schematic or circuit diagram of a dynamic unbalance alarm system embodying the principles of my invention and containing four magnetic pickup devices which may be connected in series by shifting a selector switch to the extreme right position to obtain the vector sum of the four generated voltages, which is amplified and applied to a graphic meter or relay having two movable contacts for completing an alarm circuit in the event of an abnormal unbalance;

Figure 2 is a curve of vibration plotted against speed and showing the movements of the pen on a graphic meter which records the vector sum of the voltages of the four vibration pickups in series, also showing the alarm contacts which may be contacted by the pen movements;

Figure 3 is a modification of the circuit diagram shown in Figure 1 wherein the pickups are connected in parallel and each is connected to a primary winding of a transformer, the output or secondary winding has impressed thereon the vector sum of the combined voltages generated by the pickups which is rectified and connected to a relay balanced with a bucking voltage so that the moving pen and contact will stand midway between two contacts under normal operating conditions but will engage one of the contacts upon a predetermined unbalance and operate the alarm; and Figure 4 is a schematic diagram of a further modification of my alarm system similar to that shown in Figure 2 but wherein the output of the transformer is connected to one winding of a relay similar to a single phase wattmeter, and wherein any change in phase angle of the voltages of the vibration pickups will unbalance the relay and sound an alarm.

Referring more particularly to Figure 1, numerals 1, 2, 3 and 4 denote magnetic pickup coils (or pickups) which are mounted on the various bearings or ride the shaft of a turbo-generating unit. Numerals 5 to 14 inclusive denote contacts of a selector switch arranged so that sliding contact 15 is made to connect with the odd numbered switch points at the same time that contact 16, movable therewith, is connected with the corresponding even numbered switch points.

Under normal operation of the alarm the selector switch is moved to the extreme right and contact 15 is connected to switch point 13 while contact 16 is connected to switch point 14. Under this condition the A. C. voltages of pickups 1, 2, 3 and 4 are connected in series and added vectorially and the vector sum of these voltages is applied to the amplifier 17 where it is also rectified and connected to the D. C. meter 18. As the voltage supplied to the meter changes to an abnormal extent, contact 21 which moves with the pointer on the meter or relay can touch contact 19 or 20 thus completing an alarm circuit and ringing the bell 22 energized by battery 23. Switch 24 is provided so the alarm can be disconnected during starting and stopping when vibration changes are greater than under normal operation.

When it is desired to measure the output of coil 1 only, the selector switch is moved to the dotted position so as to bridge contacts 11—12; when the output of coil 2 is desired, the switch is moved to bridge contacts 9—10; when the output of coil 3 is desired, it is moved to bridge contacts 7—8; and when the output of only coil 4 is desired, it is slid so as to bridge contacts 5—6.

Figure 2 shows the path of the pen and movable contact 21 on a graphic chart 18 for the circuit shown in Figure 1 with the four pickups in series and showing "mils vibration" plotted against speed in "R. P. M." It will be noted that after the machine is started, it will attain a critical speed and maximum vibration at point 21a and thereafter will slow down to normal speed for only a very short while and increase in vibration at point 21b, which represents the first harmonic of the critical speed, and finally it will reach normal speed and vibration at point 21c and will maintain the same thereafter during normal balance condition. Should an unbalance occur, such as through the loss of weight on the spindle, the moving pen and contact 21 will move either to the left to engage contact 20, or to the right to engage contact 19, to sound the alarm. Numeral 21d denotes the path of the recording pen and movable contact 21 before adding a 5 oz. weight to the turbine spindle in a given balance plane.

Figure 2 is a curve of vibration plotted with respect to speed and showing the movements of the pen which records the vector sum of four vibration pickups in series.

In the modification shown in Figure 3 the pickups 1, 2, 3 and 4 are connected in loop circuits with primary winding 29, 30, 31 and 32 respectively, of a transformer 34. The secondary winding 33 or output of this transformer will have impressed thereon the vector sum of the combined voltages generated by the pickups. This output voltage is then rectified by rectifier 35 and connected to potentiometer 36 of a relay 38 which is balanced with a bucking voltage furnished by battery 37 for adjusting the pointer or relay movable contact 40 so it will stand midway between the two stationary contacts 39 and 41 under normal operating conditions. The sensitivity of this relay can be adjusted for any desired value of vibration variation, that is so that any desired variation in the vector sum voltage will actuate the relay and sound the alarm 42 until the circuit is interrupted by opening manual switch 43.

Figure 4 shows a further modification of my alarm system, wherein an A. C. voltage of the same frequency as the vibration pickup voltage can be phased to operate a relay, similar to a single phase wattmeter. This relay can be balanced to a midpoint zero, by changing the position of a rotatable coil in a three phase field. The vector sum of the voltages generated by the pickups is connected to one winding of the relay, while the other winding is connected to the rotor winding of a selsyn motor. In this case, the rotor of the selsyn motor is adjusted to give an out of phase voltage to cause the relay to read zero. Any change in the phase angle of the voltages of the vibration pickups will then unbalance the relay and sound the alarm.

More specifically, Figure 4 shows a system wherein the phase angle of the vector sum voltage is used with another voltage to operate an alarm relay. Numerals 1, 2, 3 and 4 denote vibration pickups connected to transformer windings 29, 30, 31 and 32, as in Figure 3. The vector sum voltage of secondary winding 33 is connected to coil 53 of a zero center relay. Coil 54 of the relay is connected to rotor winding 61 of a selsyn motor whose stator winding 62 is connected to a three phase A. C. voltage of the same frequency as the pickup voltage and operating in synchronism with it. The voltage of coil 54 can be adjusted to a 90 degree phase relation with the voltage in coil 53 by moving the rotor 61 of the selsyn motor until the relay is set to zero. Any change in the phase angle of the voltages of the vibration pickups will unbalance the relay and cause movable contact 55 to engage either contact 56 or 57 to complete a circuit to sound alarm 60 under the energization of battery 58.

It will be apparent that the circuits of Figures 3 and 4 can be utilized to supply an alarm circuit for a unit having only one pickup, whereby a vibration voltage is balanced against any other of constant voltage and phase angle, and having the same frequency as the controlled unit. In an asynchronous unit it would be necessary to add only a small two pole A. C. generator to the end of the shaft which could also act as a speed indicator as well known in the art.

Although the various figures show alarm systems which are actuated by an abnormal unbalance, it will be apparent that an indicating lamp or meter may be used instead of the alarm to give a visual indication of the extent of the unbalance, or perhaps a relay may be actuated, much the same as those in Figures 2 and 3, to automatically operate a circuit breaker (not shown) to stop the machine which has become unbalanced to prevent injury thereto.

Thus it will be seen that I have provided an efficient and highly reliable unbalance detecting or alarm system which is responsive to both amplitude and phase angle of a vibration voltage so as to more accurately and quickly indicate an unbalance; furthermore I have provided an alarm system which will operate to warn of any malfunction of the machine that causes a change in the phase angle of the voltage generated by the vibration pickups which is more quickly and more accurately indicative of unbalance than the amplitude of the voltages generated in the respective pickup coils; furthermore I have provided a dynamic unbalance alarm system wherein the vector sum of the voltages of two or more pickup coils is used to actuate a balance type relay so that a pointer or moving contact responsive to this vector sum will move between two stationary contacts during normal operation, and will effect contact with one of them in event of an abnormal unbalance so as to actuate an alarm or visual signal or cause a control operation.

I am, of course, aware that others, particularly after reading this description of my invention, may devise other devices embodying my invention, and I, therefore do not wish to be limited to the specific showings made in the drawing, but wish to be limited only by the scope of the appended claims.

I claim:

1. A control system for detecting dynamic unbalance comprising vibration pickup coil means adapted to be mounted on the unit under test and which is responsive to changes in the phase angle and amplitude of the voltages generated in said pickup coil means, and an alarm system operable upon a predetermined change in such phase angle or amplitude.

2. A control system for detecting dynamic unbalance comprising at least two vibration pickup coils adapted to be mounted on a machine under test at several points, said coils being so interconnected as to supply a voltage which is the vector sum of the combined voltages generated in the respective coils, and electrical detecting means responsive to said vector sum and more particularly to changes in phase angle of the voltages generated by said coils.

3. A control system as recited in claim 2 wherein said detecting means comprises an alarm system which is actuated only upon an abnormal change of said vector sum of the combined voltages.

4. A control system as recited in claim 2 wherein said detecting means comprises a graphic chart, a recording pen and movable contact movable along said chart and responsive to said vector sum of voltages, a pair of stationary contacts on opposite sides of said movable contact, an alarm circuit including a source of electrical energy and said contacts whereby upon a predetermined change in said vector sum, one of said stationary contacts will be engaged by the movable contact to actuate the alarm circuit.

5. A control system for detecting dynamic unbalance, comprising a plurality of pickup coils adapted to be mounted at several points along the machine to be balanced, a transformer including a plurality of primary windings, each connected in a loop circuit with one of said pickup coils, and a secondary winding of said transformer having impressed thereon the vector sum of the voltages generated in said pickup coils, and a relay of the balance type connected to the output of said secondary winding and including detecting means responsive to an unbalance in said relay as a consequency of a predetermined dynamic unbalance.

6. A dynamic unbalance control system as recited in claim 5 wherein at least two pickup coils are used and wherein said last named relay includes a movable contact movable between a pair of stationary contacts sufficiently spaced on opposite sides of a predetermined path representing normal vibration, whereby an unbalance in the relay cause engagement with one of said stationary contacts to complete a circuit for detecting unbalance.

7. A dynamic unbalance control system as recited in claim 5 wherein said relay includes a selsyn motor having a rotor winding connected to one winding of a differential relay and a stator winding connected to a phree phase A. C. voltage of the same frequency as the pickup voltages and operating in synchronism therewith.

References Cited in the file of this patent

UNITED STATES PATENTS

| | | |
|---|---|---|
| 2,291,045 | Lancor | July 28, 1942 |
| 2,365,218 | Rogers | Dec. 19, 1944 |

FOREIGN PATENTS

| | | |
|---|---|---|
| 175,311 | Great Britain | Aug. 11, 1920 |